(12) United States Patent
Kar et al.

(10) Patent No.: US 6,526,327 B2
(45) Date of Patent: Feb. 25, 2003

(54) ONE-STEP RAPID MANUFACTURING OF METAL AND COMPOSITE PARTS

(75) Inventors: Aravinda Kar, Orlando, FL (US); Srikanth Sankaranarayanan, Orlando, FL (US); Franz-Josef Kahlen, Orlando, FL (US)

(73) Assignee: University of Central Florida, Orlando, FL (US)

( * ) Notice: Subject to any disclaimer, the term of this patent is extended or adjusted under 35 U.S.C. 154(b) by 84 days.

(21) Appl. No.: 09/731,993

(22) Filed: Dec. 7, 2000

(65) Prior Publication Data

US 2001/0002287 A1 May 31, 2001

Related U.S. Application Data

(62) Division of application No. 09/221,553, filed on Dec. 28, 1998, now Pat. No. 6,203,861.
(60) Provisional application No. 60/071,252, filed on Jan. 12, 1998.

(51) Int. Cl.$^7$ .............................................. B23K 26/00
(52) U.S. Cl. ..................... 700/119; 700/98; 700/118; 700/120; 700/159; 700/166; 219/121.6
(58) Field of Search ........................... 700/98, 118, 119, 700/120, 159, 166; 219/121.6, 121.61, 121.65

(56) References Cited

U.S. PATENT DOCUMENTS

| | | | |
|---|---|---|---|
| 4,299,860 A | 11/1981 | Schaefer | 427/53.1 |
| 4,644,127 A | 2/1987 | Larocca | 219/121 |
| 4,814,575 A * | 3/1989 | Petitbon | 219/121.64 |
| 5,132,248 A | 7/1992 | Drummond | 437/173 |
| 5,147,680 A | 9/1992 | Slysh | 427/53.1 |
| 5,189,781 A | 3/1993 | Weiss | 29/527 |
| 5,208,431 A | 5/1993 | Uchiyama | 219/121.65 |
| 5,216,616 A | 6/1993 | Masters | 364/474.24 |
| 5,239,160 A | 8/1993 | Sakura | 219/121.82 |
| 5,314,003 A | 5/1994 | Mackay | 164/494 |
| 5,316,580 A | 5/1994 | Deckard | 118/110 |
| 5,384,523 A | 1/1995 | Masuda | 318/568.19 |
| 5,385,780 A | 1/1995 | Lee | 428/325 |
| 5,393,613 A | 2/1995 | Mackay | 428/553 |
| 5,398,193 A | 3/1995 | Deangelis | 364/468 |
| 5,449,536 A | 9/1995 | Funkhouser | 427/597 |
| 5,475,617 A | 12/1995 | Castonguay | 385/115 |
| 5,622,577 A | 4/1997 | Oconnor | 156/62.2 |
| 5,688,564 A | 11/1997 | Coddet | 427/554 |
| 5,837,960 A * | 11/1998 | Lewis et al. | 219/121.63 |

\* cited by examiner

*Primary Examiner*—Leo Picard
*Assistant Examiner*—Michael D. Masinick
(74) *Attorney, Agent, or Firm*—Brian S. Steinberger; Law Offices of Brian S. Steinberger, P.A.

(57) ABSTRACT

A one-step rapid manufacturing process is used to create three dimensional prototyping parts. Material such as metal, ceramics and the like powder, and wire, and the like, is delivered to a laser beam-material interaction region where it is melted and deposited on a substrate. The melted and deposited material is placed on a XYZ workstation. Three dimensional parts are created by moving the XYZ workstation relative to the laser beam while simultaneously feeding powdered alloys, first in the XY and then in the Z plane. Beam shaping focusing optics can be used to tailor the intensity distribution of the laser beam to the requirements of the deposition layers, and can be used to create parts with desired mechanical or thermodynamic properties. Additional beam splitting and recombining optics can be used to allow powder to be fed at a perpendicular angle to the substrate.

18 Claims, 11 Drawing Sheets

ONE-STEP RAPID MANUFACTURING OF METAL AND COMPOSITE PARTS

This is a Divisional of application Ser. No. 09/221,553 filed Dec. 28, 1998, now issued as U.S. Pat. No. 6,203,861, which claims the benefit of priority to U.S. Provisional Application Serial No. 60/071,252 filed Jan. 12, 1998, and this invention relates to part manufacturing, and in particular to a one step rapid manufacturing method and system to create three dimensional (3D) prototyping parts where material such as metal, ceramics and the like, is delivered to a laser beam interaction region in powderized form or as a wire where it is melted on a substrate the latter of which is moved in the three translational directions (X, Y, and Z directions).

BACKGROUND AND PRIOR ART

Rapid tool manufacturing techniques such as Selective Laser Sintering, Stereolithography, and rapid prototyping are the techniques generally used for the rapid recreation of parts. However, these techniques create parts that are generally suitable for use in space and design studies and not for real world applications. Furthermore, these tool manufacturing techniques generally require soft tools, molds and casting to often create plastic type fabricated parts with many inherent problems since these techniques do not use the same materials as the original part to be recreated. The prior known manufacturing techniques are prone to create fabricated parts different from the original parts. For example, it one were to use stereolithography to manufacturer a plastic fan wheel, the resultant part would have different surface characteristics and weights than an aluminum flywheel that is desired to be duplicated. Important characteristics such as flow separation points, efficiency of operation, pressure ratio over the blades, mass flow therethrough, will be different. Also plastic parts created by stereolithography cannot operate in high temperature environments. Thus, plastic car exhaust parts created by stereolithography manufacturing techniques would not be useful for the high temperature environments of vehicle engine emissions. Furthermore, these plastic fabricated parts would have a very short lifespan in chemically active environments.

Using a casting manufacturing technique creates a part having a homogeneous uniform material. Thus, casted parts exhibit uniform mechanical and thermophysical properties throughout their structure. Casted parts cannot have materials with graded (varied) compositions. Casted parts may crack and break down in applications where increased strength characteristics are needed such as along the center axle region of the fly wheel example.

The prior known techniques are not useful for refurbishing damages to existing parts (e.g. camshafts) nor for fixing localized damage such as scratches on existing parts. Furthermore, the known manufacturing techniques are not useful for providing any wear resistant coatings to existing parts.

The prior known techniques involve a number of steps for parts fabrication, including sintering, mold and die casting, using material mixtures containing materials other than the original material, or using support structures during fabrication.

Many U.S. patents have been proposed but fail to overcome all the problems presented above. See for example: U.S. Pat. No. 5,189,781 to Weiss et al.; U.S. Pat. Nos. 5,314,003 and 5,393,613 to Mackay; and U.S. Pat. No. 5,316,580, to Deckard employ predeposited powder in a flat bed which is leveled in a form and melted by a scanning laser beam; U.S. Pat. No. 5,384,523 to Masuda; U.S. Pat. No. 5,385,780 to Lee sinters polymer powder; U.S. Pat. No. 5,398,193 to de Angelis requires masks to make parts, also, the process creates sharp boundaries between two different materials; U.S. Pat. No. 5,475,617 to Castonguay; and U.S. Pat. No. 5,622,577 to O'Connor requires two different processing chambers, and also employs a predeposited powder. Although, in recent years, several processes were developed which enable the user to fabricate parts from stronger materials than commonly used in conventional Rapid Prototyping processes, or even to fabricate parts with a metal content. These processes do not solve all of the problems stated above. Some of these techniques can take as many as nine (9) or more steps to fabricate the final part. From an end users point of view, this is a very time-consuming and costly option.

Several related but overly complex tools have been suggested in the past. See for example U.S. Pat. No. 5,239,160 to Sakura et al. (Five-Axis Table); U.S. Pat. Nos. 4,726,715 and 4,803,335 to Steen et al. (powder delivery); U.S. Pat. No. 4,724,299 to Hammeke (Laser Spray Nozzle); U.S. Pat. Nos. 5,453,329 and 5,477,025 to Everett et al. (Powder Nozzle and Abrasive Particle Deposition). These inventions present an "overkill" in terms of their operation, usage, maintenance, and operating costs.

The Mechanical Engineering Magazine March 1997 edition describes many of the prior art techniques. Ashley, Steve, "From CAD art to rapid metal tools", Mechanical Engineering, March 1997, pages 82–87, introduces a similar process, called LENS (Laser Engineered Net Shaping) by Sandia National Laboratories. Major limitations of LENS are the restrictions of being able to fabricate extruded parts only (having no undercuts nor overhangs. Also, the process is based on using four powder delivery nozzles. Rapid Manufacturing is capable of creating undercuts and overhangs, also, the alignment of the powder delivery to the focussed laser beam is easier as the powder is delivered by one nozzle only. In addition, the introduction of turbulences into the shield gas flow, due to aligning and interaction of multiple shield gas jets is eliminated. The LENS-process is distinctly different from the Rapid Manufacturing process of the subject invention described here, in that it requires an enclosure around the laser beam-material powder interaction region to create a non-oxidizing environment. The preferred embodiment for LENS appears to be Argon shield gas, whereas the Rapid Manufacturing of the subject invention process has worked successfully with different shield gases, such as Helium and Nitrogen. Also, for the Rapid Manufacturing process of the subject invention, it is optional to use the same material as base substrate and for the deposition whereas LENS apparently is preferentially used for same material combinations. Finally, LENS so far does not incorporate real-time sensor feed back.

None of the prior art know to the subject inventors comprises all the desirable features of: full fabrication out of the original material, fabrication in one step, without dependence on support structures.

SUMMARY OF THE INVENTION

The first objective of the present invention is to provide for the one-step method and system for the manufacturing of three dimensional metal and composite parts on a need-be basis, wherein the geometry of the part/tool to be manufactured can be stored on a computer hard drive/disk.

The second object of this invention is to provide for the one-step method and system for the manufacturing of three dimensional metal and composite parts without using support structures and allowing for the realization of undercuts and overhangs.

The third object of this invention is to provide for the one-step method and system for the manufacturing of three dimensional metal and composite parts where the local composition of the parts can be graded (varied) increased and lowered along metallurgical limitations. If the requirements for a component call for high strength in one region and high thermal conductivity in another region, the powder composition can be varied accordingly.

The fourth object of this invention is to provide for the one-step method and system for the manufacturing of three dimensional metal and composite parts that allows for worn damaged parts to be refurbished and reprocessed to fix damaged and scratched areas.

The fifth object of this invention is to provide for the one-step method and system for the manufacturing of three dimensional metal and composite parts, for coating parts to enhance wear resistance.

The sixth object of this invention is to provide for the one-step method and system for the manufacturing of three dimensional metal and composite parts that does not require an enclosure with inert gases to avoid oxidation during the fabrication of parts. Shield gas is delivered coaxially to the laser beam to create a non-oxidizing environment at the location where the material is deposited.

The seventh of this invention is to provide for the one-step method and system for the manufacturing of three dimensional metal and composite parts that does not require an enclosure with inert gases to avoid oxidation during the fabrication of parts. Non-oxidizing carrier gas is used to deliver material powder(s) to the laser beam to create a non-oxidizing environment at the location where the material(s) are deposited.

The eighth object of this invention is to provide for the one-step method and system for the manufacturing of three dimensional metal and composite parts where material powder(s) is delivered to the deposition region by one nozzle only, eliminating the alignment and powder and carrier gas distribution problems associated with multiple nozzle setups.

The ninth object of this invention is to provide for the one-step method and system for the manufacturing of three dimensional metal and composite parts where a non-oxidizing shield gas is supplied coaxially to the laser beam and material(s) in form of a wire is delivered to the deposition region.

The tenth object of this invention is to provide for the one-step method and system for the manufacturing of three dimensional metal and composite parts where material(s) in form of a wire(s) is delivered the deposition region.

The eleventh object of this invention is to provide for the one-step method and system for the manufacturing of three dimensional metal and composite parts where a processing laser beam (and its' intensity distribution) is shaped by beam shaping optics or adaptive optics such that desired product properties can be achieved during parts fabrication, without post-processing.

The twelfth object of this invention is to provide for the one-step method and system for the manufacturing of three dimensional metal and composite parts where the powder stream or the material wire is delivered coaxially to the processing laser beam.

The thirteenth object of this invention is to provide for the one-step method and system for the manufacturing of three dimensional metal and composite parts that allows for surface alloying of existing parts.

The fourteenth object of this invention is to provide for the one-step method and system for the manufacturing of three dimensional metal and composite parts where the new part can be joined with the substrate (forming an add-on to an existing part) or can be created without attaching to the substrate.

A preferred embodiment of the invention has three-dimensional structures being formed by a layer by layer deposition process. The first layer was formed in the X-Y planes and the subsequent layers were formed on one another to build the structure in the Z-direction. The dimensions of the components were controlled by a XYZ translational stage interfaced to a computer. 3-D computer images were created using Motion Control Interface Firmware (MCIF) software and down loaded to the controller of the XYZ stage.

The invention can be connected to a visual feature and geometry recognition system which records, examines, slices, and runs the computer controlled system for parts creation.

For the fiber-optic beam delivery multiple-location application, processing can be realized by assigning different tasks to different fiber optics. One fiber head can deliver the laser beam for powder deposition while other fiber heads can deliver the beams for additional processing (cutting, drilling, welding, and the like). This concept utilizes the different materials processing features of lasers, and in the process eliminates the necessity for moving components from one workstage to another, it also shortens the time required for the processing as some tasks can be carried out simultaneously by different fiber heads.

Beam shaping optics can be used to create non-symmeteric laser beams, such as but not limited to elliptical, triangular lines and the like, before processing. A laser beam can be spread along the line of material deposition; the region of highest laser beam intensity (front) provides the energy required for material melting whereas the trailing portion of the laser beam (decreasing intensity) imposes a thermal gradient upon the deposited material during its re-solidification. An advantage of this setup is that the trailing part of the beam provides the environment (spatial, temporal) for the material cooling rate and, as a consequence, for phase formation during re-solidification. This is effectively a phase of post-processing during which, e.g., the hardness of the material will be determined.

The beam shaping of the subject invention is not limited to applications in Rapid Manufacturing, but can also be applied to other processes such as but not limited to laser welding, surface treatments, and the like.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
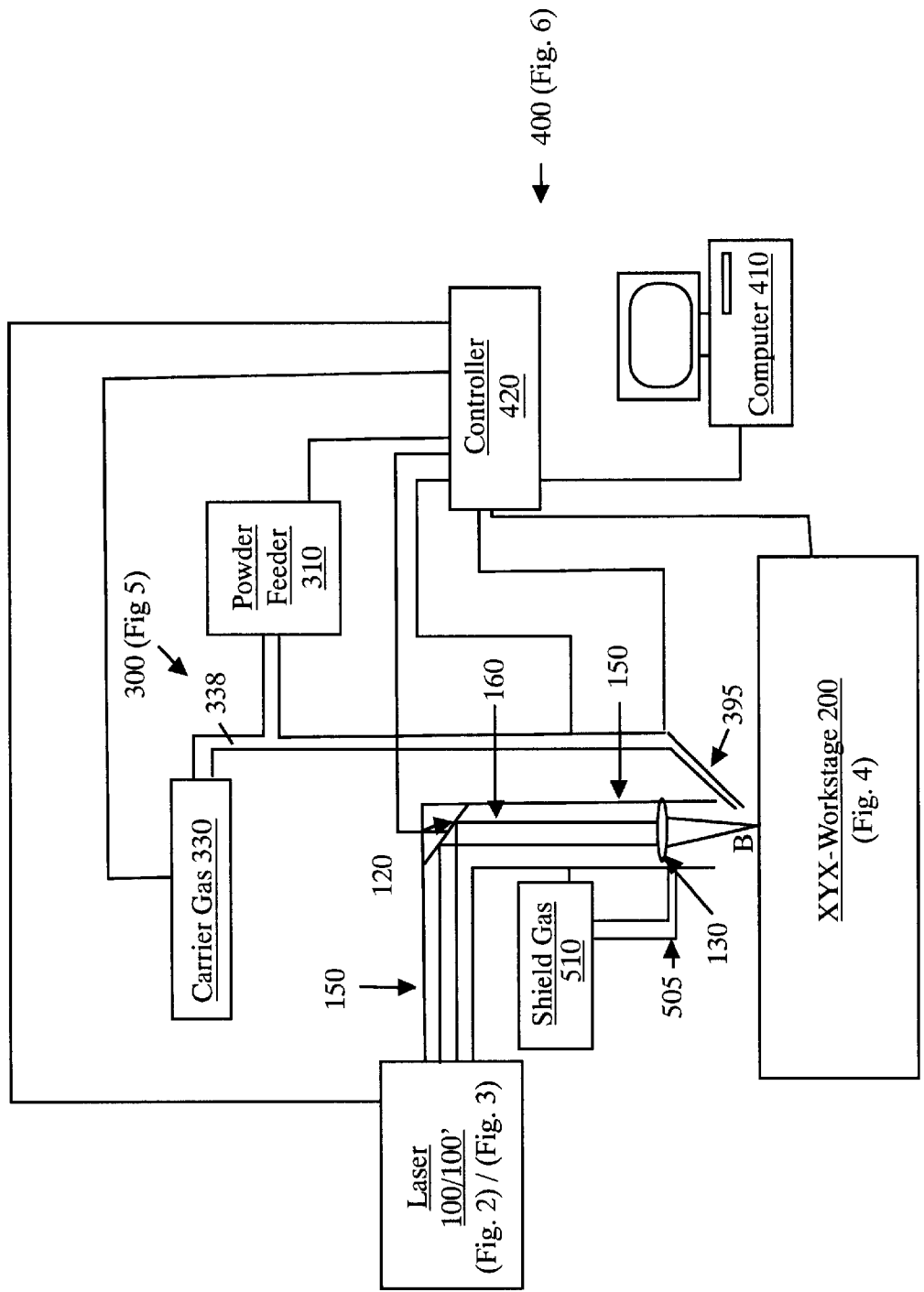
FIG. 1 shows a preferred embodiment layout of the one step rapid manufacturing system invention.
Figure 2:
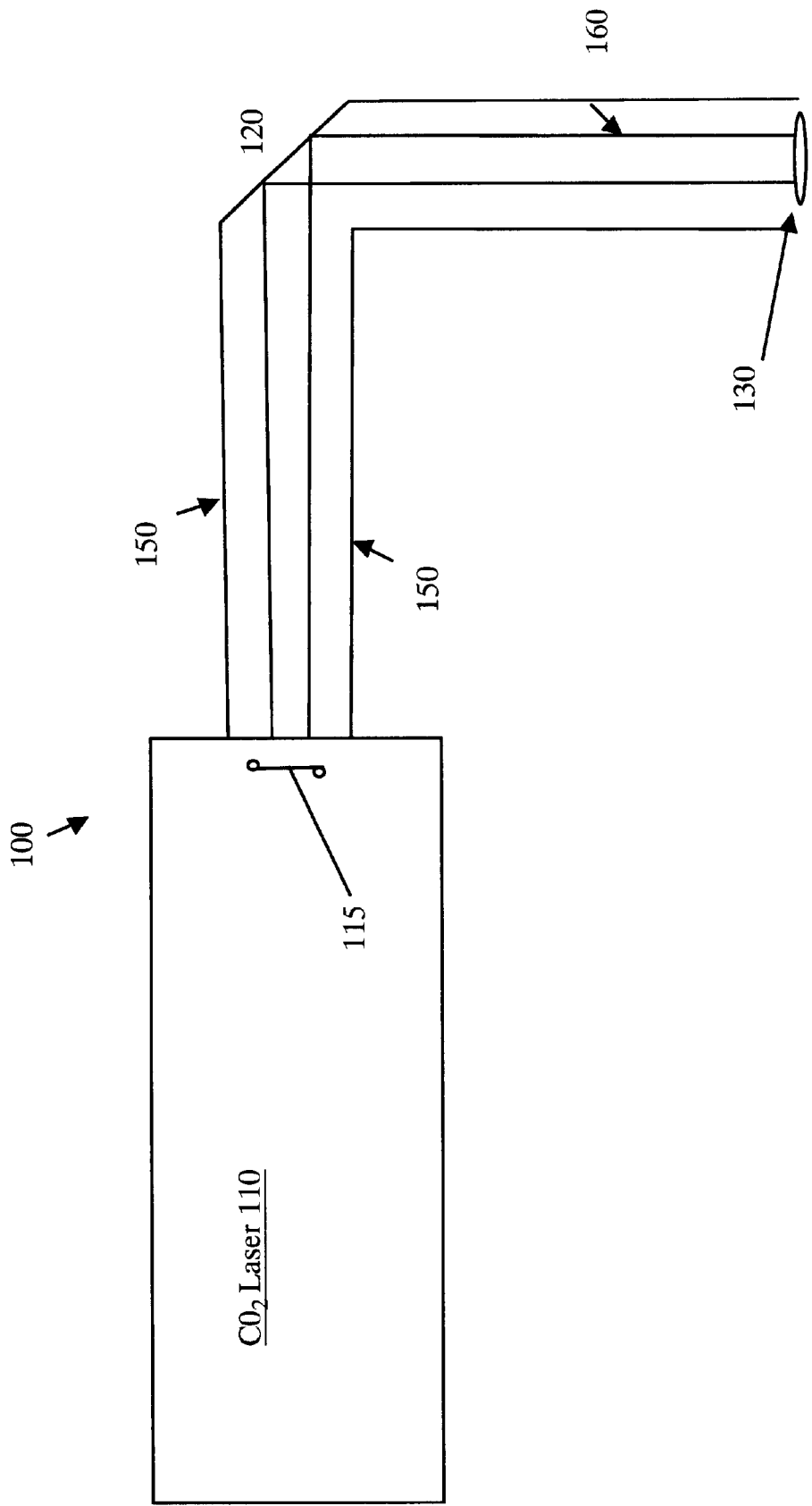
FIG. 2 shows the beam delivery system of a laser source, beam delivery optics and beam focussing optics used in the manufacturing system of FIG. 1.

FIG. 1 shows a preferred embodiment layout 1 of the one step rapid manufacturing system invention. FIG. 2 shows the beam delivery system 100 of a laser source 110, beam delivery optics and beam focussing optics used in the manufacturing system of FIG. 1.

Figure 4:
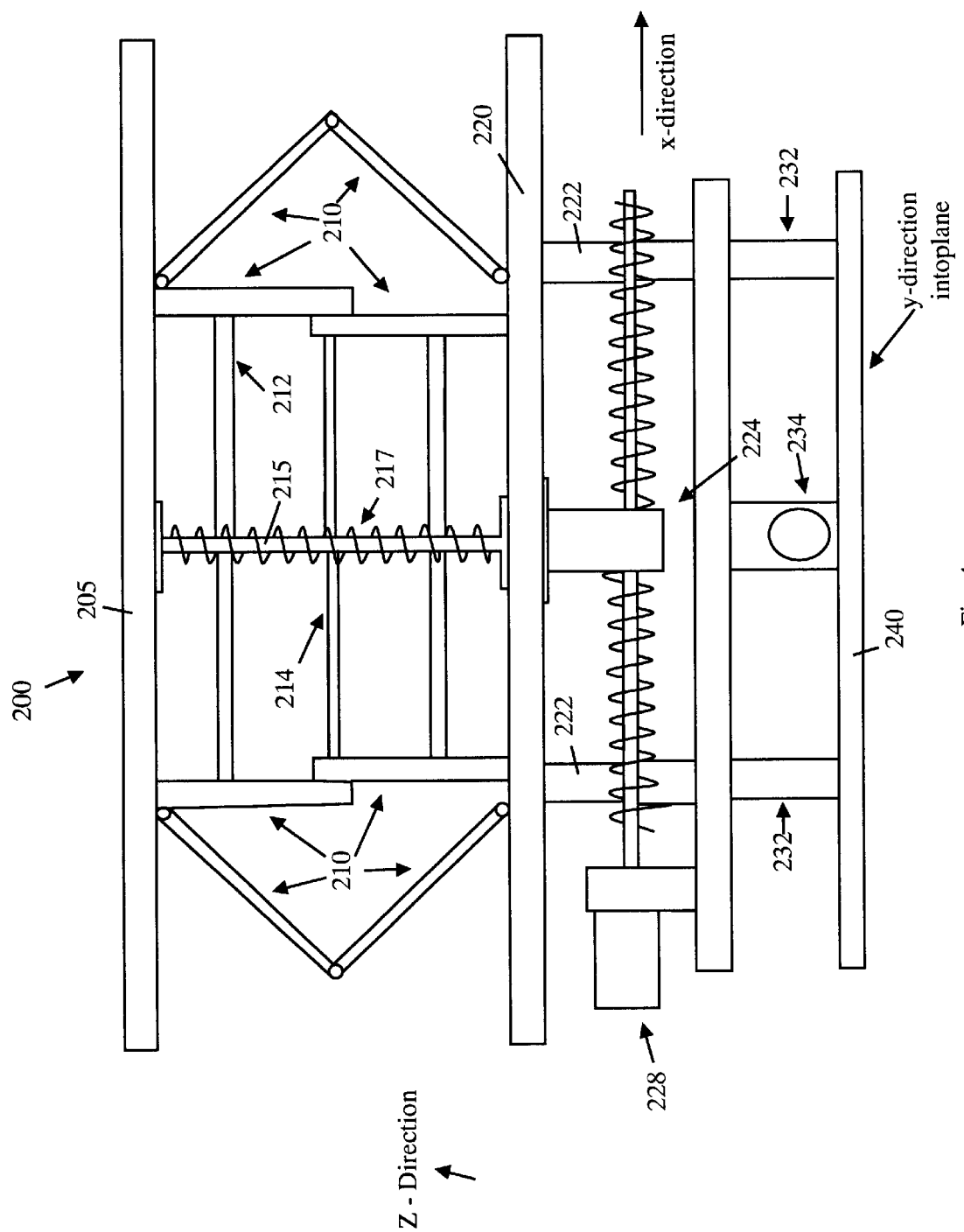
FIG. 4 is an enlarged view of the XYZ workstation used in the manufacturing system of FIG. 1.

Referring to FIGS. 1 and 2, a $CO_2$ laser 110 (having a continuous wave or pulsed wave) can be operated at a power level of 356 W, generated a top-hat shaped laser beam directed towards the beam delivery optics 120 (reflective mirror) which reflects the beam towards a focussing unit 130, here displayed as a lens but could be replaced by other reflective optics, such as but not limited to a parabolic mirror, spherical mirror, adaptic optic, and the like, to form a spot beam point to the top surface of the XYZ Workstage 200 (shown and described in greater detail in reference to FIG. 4). For safety reasons, the laser beam path can be enclosed by transmission tubes 150 from the shutter 115 to the beam focussing optics 130. The shutter 115 can be moved into and out of the laser beam by computer 410 and controller 420.

FIG. 4 is an enlarged view of the XYZ workstation 200 used in the manufacturing system of FIG. 1. Three stepping motors 228, 224 and 234 can be used to translate movement in the X, Y, and Z directions, respectively. The types of stepping motors can be "Intelligent Motion Systems, Inc., Stepping motor, manufacture no. M2-3424-S. Components 217 are threaded rods, each having outer diameters of approximately 0.6 inches, and a thread width of approximately 0.1 inches. Work table 205 is used to place the substrate (not shown) thereon. The scissor-type parts 210 are used for structural support of the elevated work table 205 and to avoid an angular motion, units 212 and 214 are used for structural stability of the scissors 210 and to enable a rotating scissor axis, respectively. 222 and 232 are mounting struts for the stepping motors 228, 224 in the X and Y direction, respectively. Components 205, 210, 212, 222 and 232 can be made from aluminum, and component 214 can be a stainless steel rod. If the table is elevated in the Z-direction, the scissors 210 open up and prevent angular motion of the work table 205 in the XY-plane. Motions in X and Y directions are initiated by stepping motors 228, 224 and the whole work stage is translated in the selected direction(s).

Figure 5:
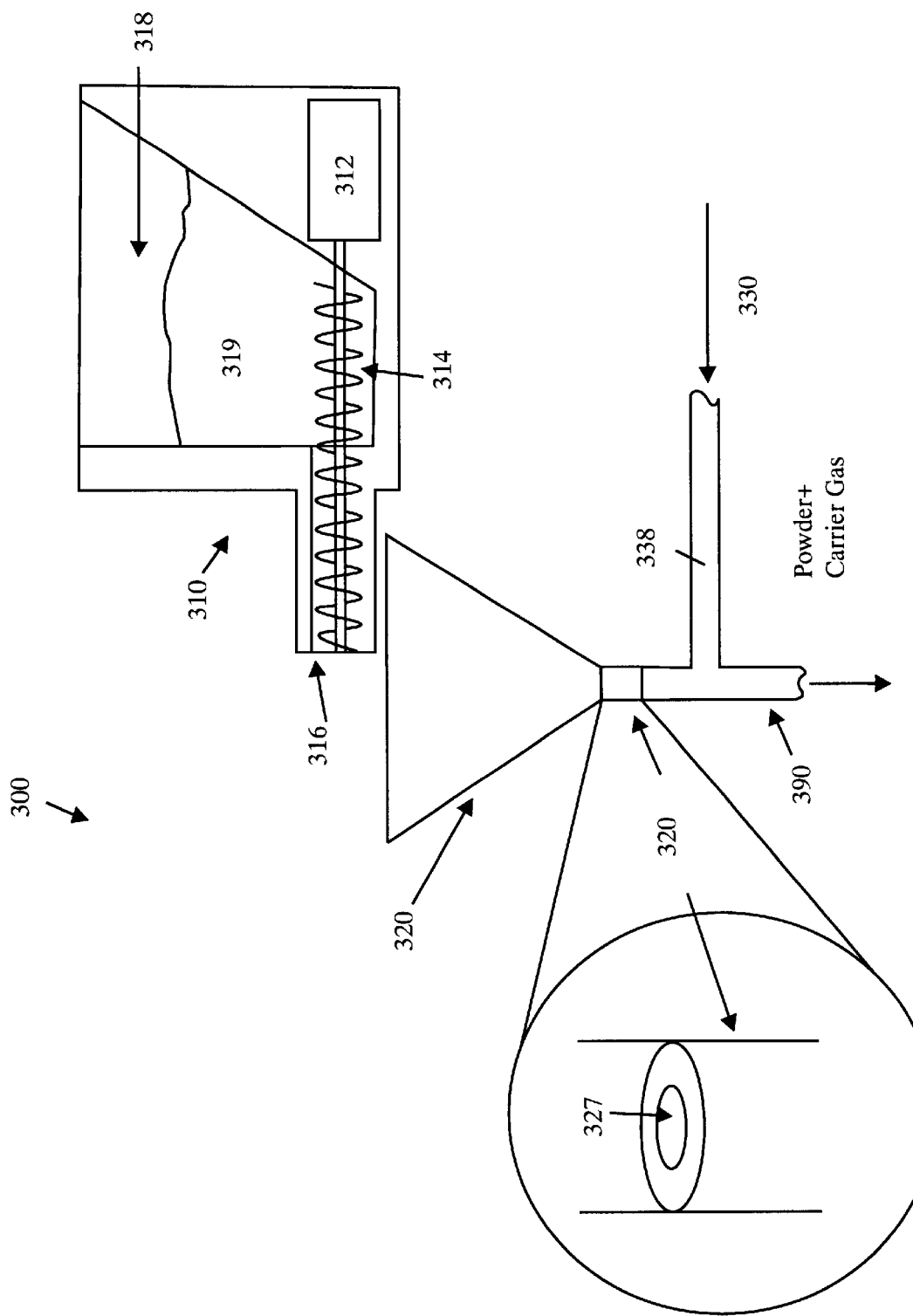
FIG. 5 is an enlarged view of the powder feeder and carrier gas connection in the system of FIG. 1.

FIG. 5 is an enlarged view of the powder feeder and carrier gas connection 300 used in the system of FIG. 1, and includes a powder feeding unit 310 and the carrier gas connection 338 of FIG. 1. FIG. 5 includes an enlarged view 320 of the restricted orifice 327 for the powder flow. Powder feeder 310 can be an Accurate volumetric powder feeder having a motor 312, a helux 314 for powder delivery, a pipe extension 316 for the helix 314, and a container 318 for the powder 319. The powder 319 is fed from the container 318 by the helix 314 into a funnel 320 with a restricted orifice 327. The restriction 327 serves as a fine tuner for the powder flow rate, and can be a disk with a variable diameter center hole. Funnel 320 serves as a pre-mixer for different powders being used for parts fabrication, and is an averager for potential fluctuations in the powder feed rate from the helix 314. If only one powder 319 is used, the funnel 320 can be omitted. The configuration of FIG. 5 allows for plural adjacent powder feeder(s) 310 to feed powder 319 into the same funnel 320. After the powder 319 passes through the orifice 327, it falls down into the delivery tube 390 (having an inner diameter of approximately 3 mm), where it mixes with the low-volume carrier gas 330 supplied by tube 338. Carrier gas 330 can be chosen from gases such as but not limited to nitrogen, helium, argon, and the like, and having a flow rate of approximately 1 to approximately 20 liters per minute proportional to powder flow rates. The carrier gas 330 provides for an even powder flow and mixing of different powders through the delivery tube 390. Depending upon the powder flow rate, powder 319 exits the delivery tube 390 through a channel 395 (FIG. 1) having a diameter of approximately 1.5 mm at an angle of approximately 30 to approximately 50 degrees with respect to the laser beam B.

Figure 7:
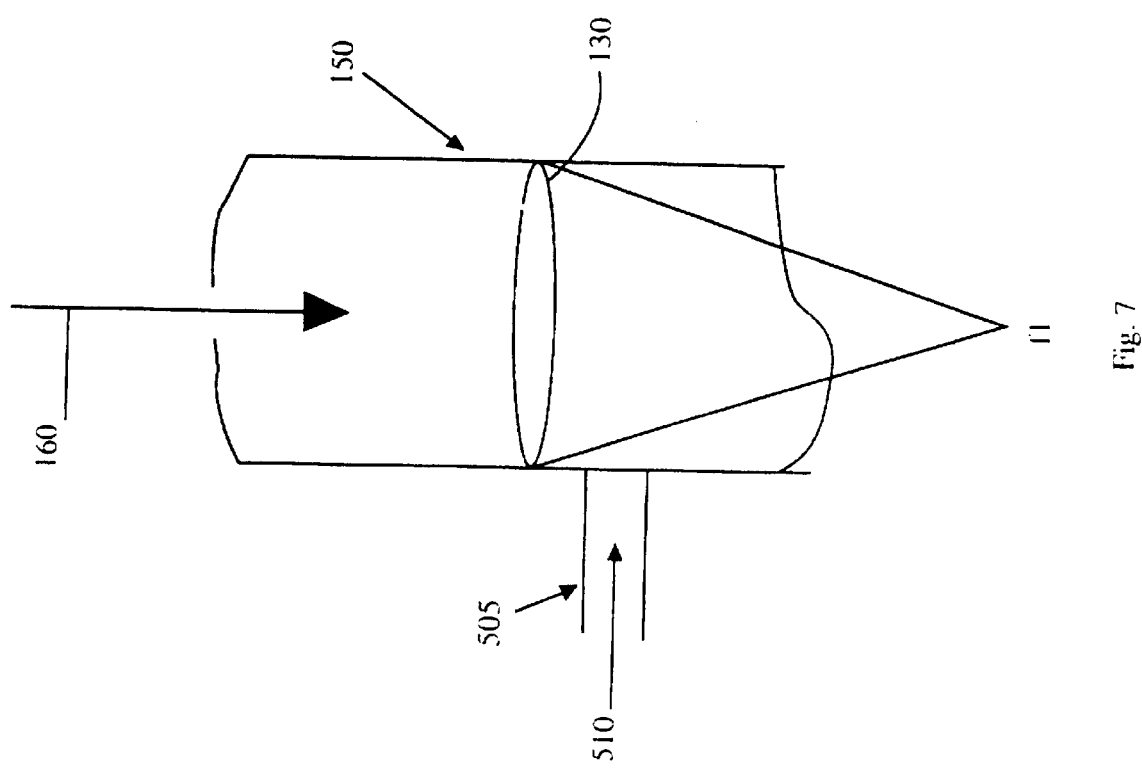
FIG. 7 shows the shield gas connection used in the manufacturing system of FIG. 1.

FIG. 7 shows the shield gas connection 500 used in the manufacturing system of FIG. 1. Referring to FIG. 7, shield gas 510, such as Argon, and the like, flows at a rate of approximately 15 liters per minute through flow tube 505 into beam transmission tube 150. The interaction between the laser-heated material and surrounding air will cause oxide formation resulting in oxide particles in the finished part, which is detrimental to the mechanical strength of the part. To prevent this argon gas 510 is used as a shielding gas. The shielding gas 510 serves two purposes, first to cool the lens 130, second to provide effective shielding against oxidation at the laser interaction zone.

Referring to FIGS. 1, 5, and 7, powder 319 coming out of the feeder nozzle 395 interacts immediately with the laser beam to form liquid droplets and gets deposited on the substrate. (See FIG. 8 for a basic drawing of the substrate 170 and some deposited layers 175). The flow rate of the shielding gas 510 is also kept low to prevent driving away from the powder particles 319 from the interaction zone. The surface of the substrate 170 was placed at the focal point f1, of lens 130.

Figure 6:
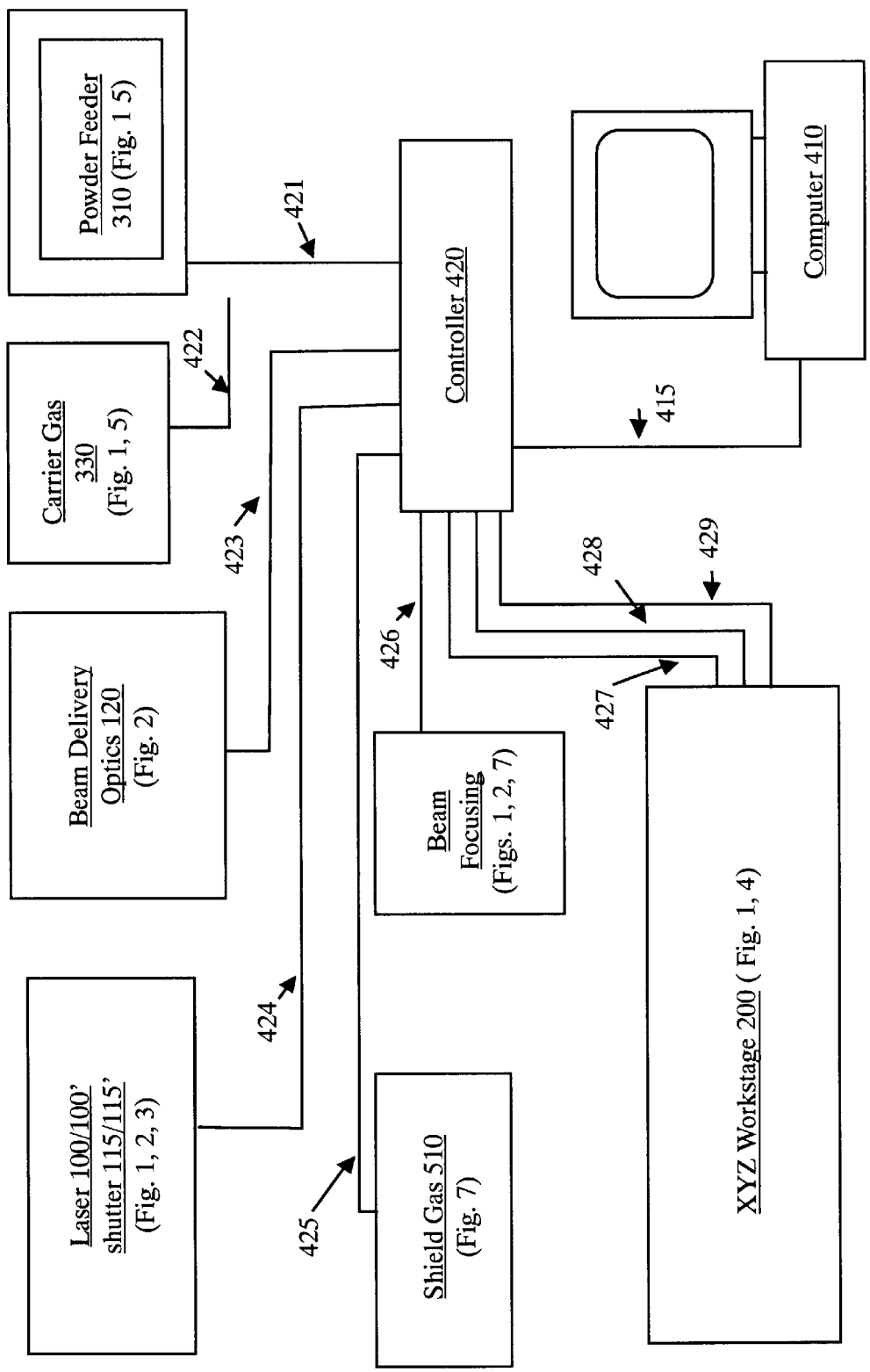
FIG. 6 is a view of the computer control system used in the manufacturing system of FIG. 1.

FIG. 6 is an over view of the computer control system 400 used in the manufacturing system of FIG. 1. Laser 100 (FIG. 2), 100 (FIG. 3), the powder delivery components 310 (FIG. 1, 5), the XYZ workstage 200 (FIGS. 1, 4), the selection and positioning of the beam focussing and delivery optics 120

(FIGS. 1, 2, 7) 130 (FIG. 2), and the fiber optics (FIG. 3), and the shield gas flow rates 510 (FIGS. 1, 7) and carrier gas flow rate 330 (FIGS. 1, 5) are controlled by a computer 410, here an IBM compatible Pentium P5-120. Controller 420 is separately connected by lines 421, 422, 423, 424, 425, 426, 427, 428, 429 to the system components 100, 100', 120, 130, 200, 310, 330, 510 using standard line interface connections. Computer 410 controls the open and close cycle of the laser shutter 115 (FIG. 2), the shield gases 510, the carrier gases 330, as well as the flow rates of these gasses 330, 510. Computer 410 was operated using Motion Control Interface Firmware (MCIF) software, suitable for operation with Windows 3.1x, Windows 95 and Windows 98.

Figure 3:
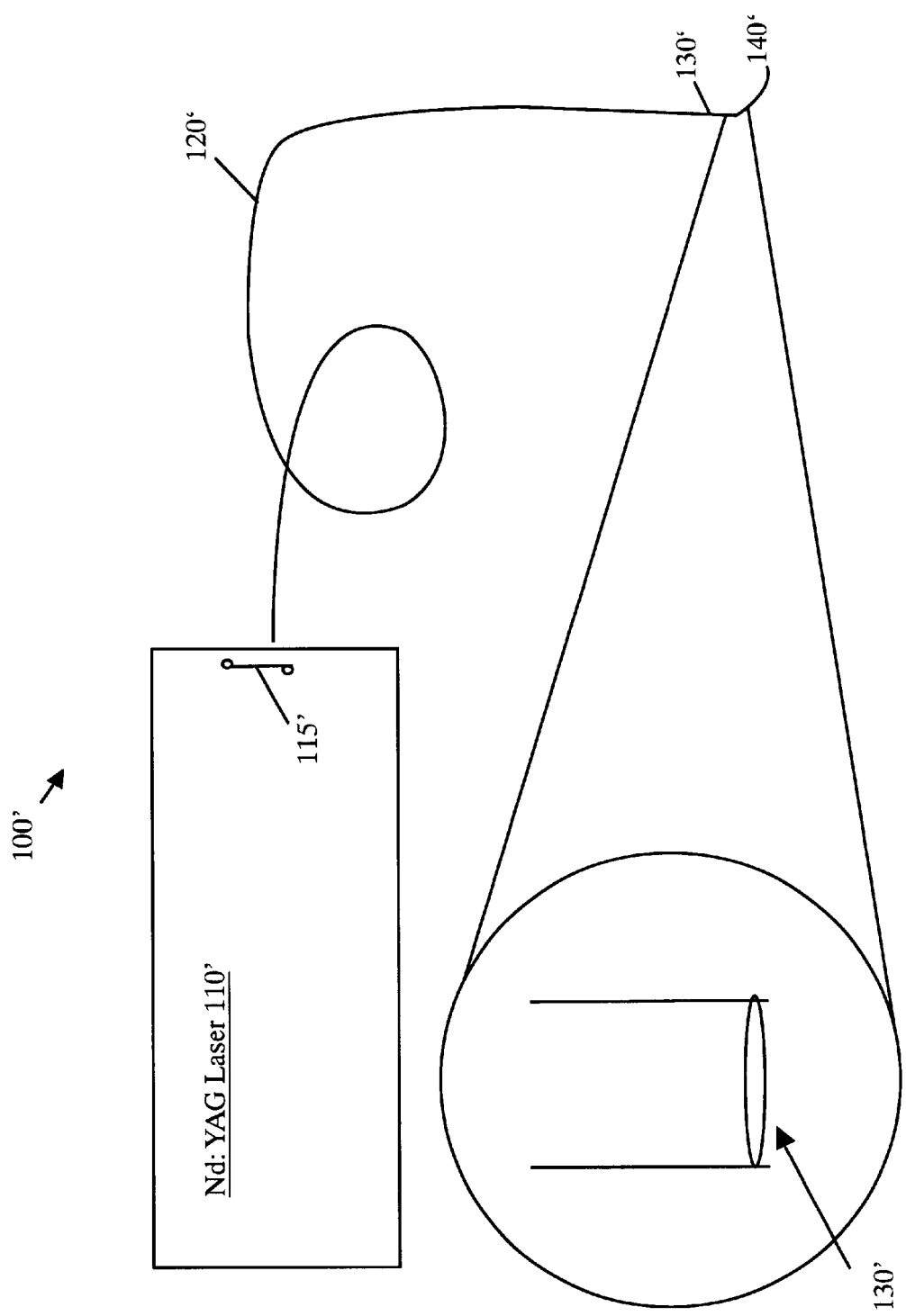
FIG. 3 shows an alternative beam delivery system of a laser source, fiber optic cable, and beam focussing optics/fiber output coupler for use in the manufacturing system of FIG. 1.

FIG. 3 shows an alternative beam delivery system 100' of a laser source 110', fiber optic cable 120', and beam focussing optics 130' and fiber output coupler 130' for use in the manufacturing system of FIG. 1.

Referring to FIGS. 1, 3–7, laser 110' can be a Nd:YAG laser with a shutter 115'. The operating ranges (power, intensity, distribution in the beam are similar to the one for a $CO_2$ laser, and can be used with fiber optic cables 120', focussing optics 130', and fiber output coupler 140' similar to those described above. In operation, the Nd:YAG laser 110' takes the place of the $CO_2$ laser 110, the fiber optic cable 120' and fiber output coupler 130' has the same function and the delivery of the processing laser beam to the substrate only, the parts fabrication and the process control are not affected.

Figure 8:
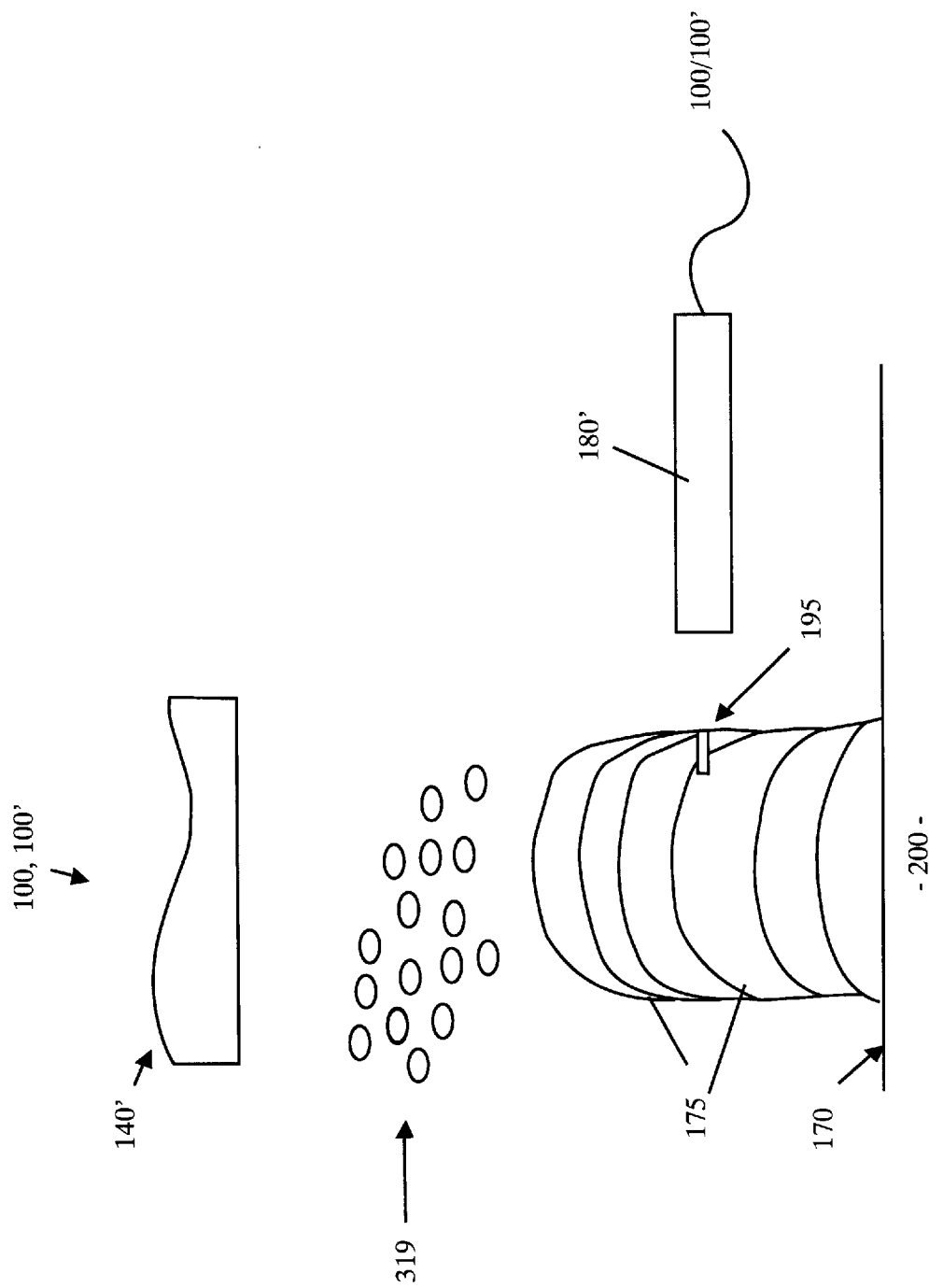
FIG. 8 shows an example of Multiple-Application systems using Nd:YAG lasers.

FIG. 8 shows an example of a multiple application system, illustrated by an optical fiber output coupler 140' processing a powder flow 319 and forming a layered structure 175 on substrate 170 (on top of XYZ workstage 200. Simultaneously, a second optical fiber output coupler 180' connected a laser source 100/100' can be used to drill a hole 195 into the fabricated part 175/170.

Figure 9:
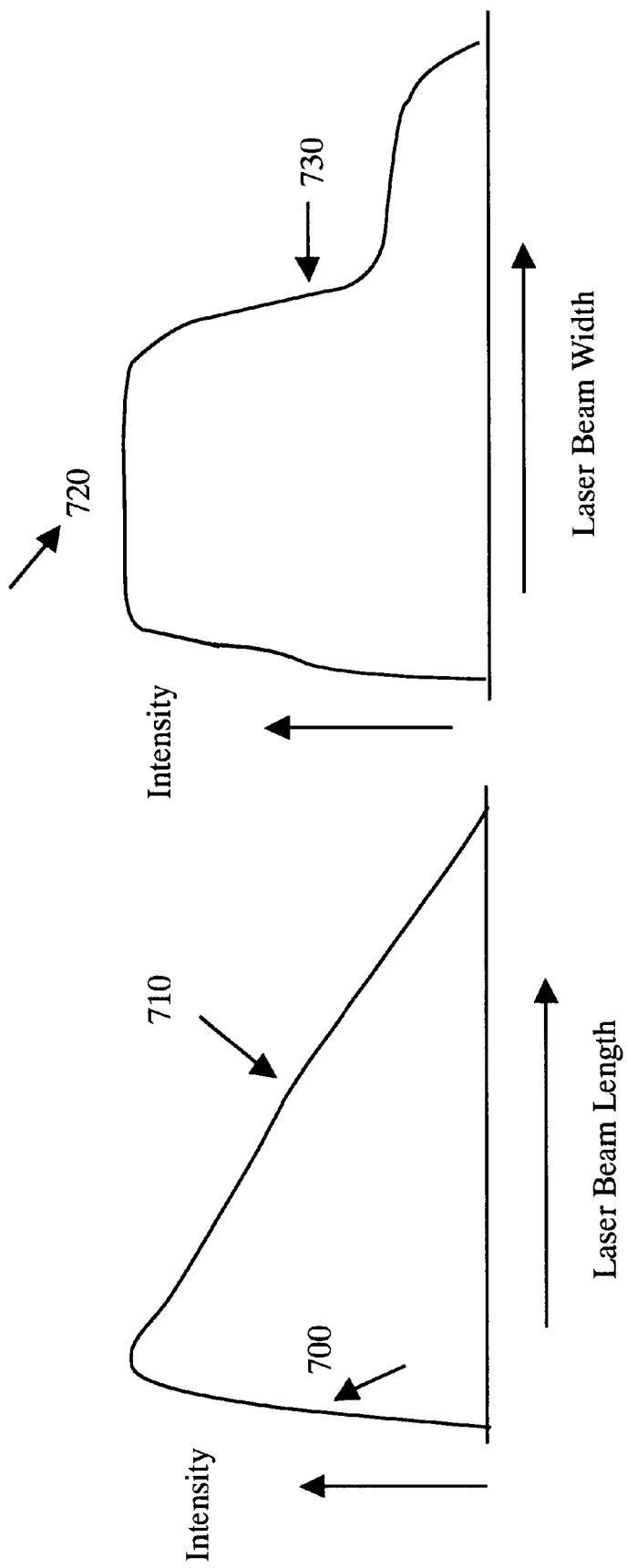
FIG. 9A shows a graph of laser beam length versus intensity for an example of a Laser Beam Shape tailored to the parts' selected properties.
FIG. 9B shows a graph of laser beam width versus intensity for an example of a Laser Beam Shape tailored to the parts' selected properties.
Figure 10:
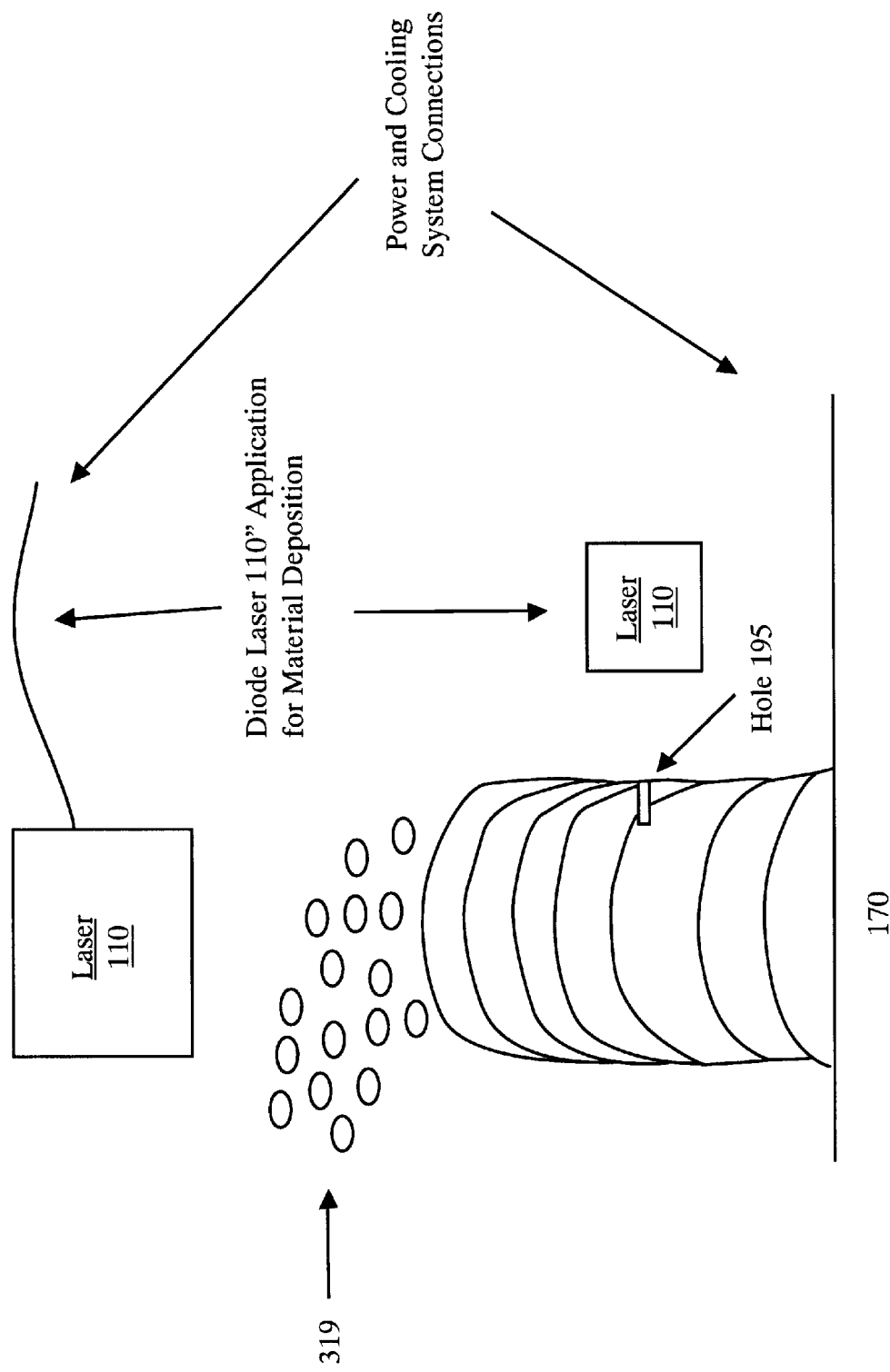
FIG. 10 shows an example of Multiple-Application systems using diode lasers.

FIGS. 9A–9B, show graphical distributions of a laser beam intensity being distributed asymmetrically with the laser beam. FIG. 9A shows a graph of laser beam length versus intensity for an example of a Laser Beam Shape tailored to the parts' selected properties. Referring to FIG. 9A, the ramped high laser beam intensity 700 provides a sufficient local energy density to melt the powder material while simultaneously imposing a thermal gradient 710 on the solidifying and solidified deposited layer.

FIG. 9B shows a graph of laser beam width versus intensity for an example of a Laser Beam Shape tailored to the parts' selected properties. By providing an asymmetric intensity distribution along the direction of the laser beam motion 720 and 730 of FIG. 9B, one can force different features (for example increased/decreased hardness) on both sides of the deposited material.

FIGS. 9A and 9B shows that by using asymmetric components in the beam delivery system (e.g. lenses focussing the beam into an elliptical spot, adaptics optics, and the like), it is possible to tailor the intensity distribution in the beam to the requirements at the deposition region or to create parts with pre-selected mechanical or thermodynamic properties, e.g., by superimposing a thermal gradient on to the deposited layer or by heat treating and/or preheating the previously deposited layers.

Figure 11:
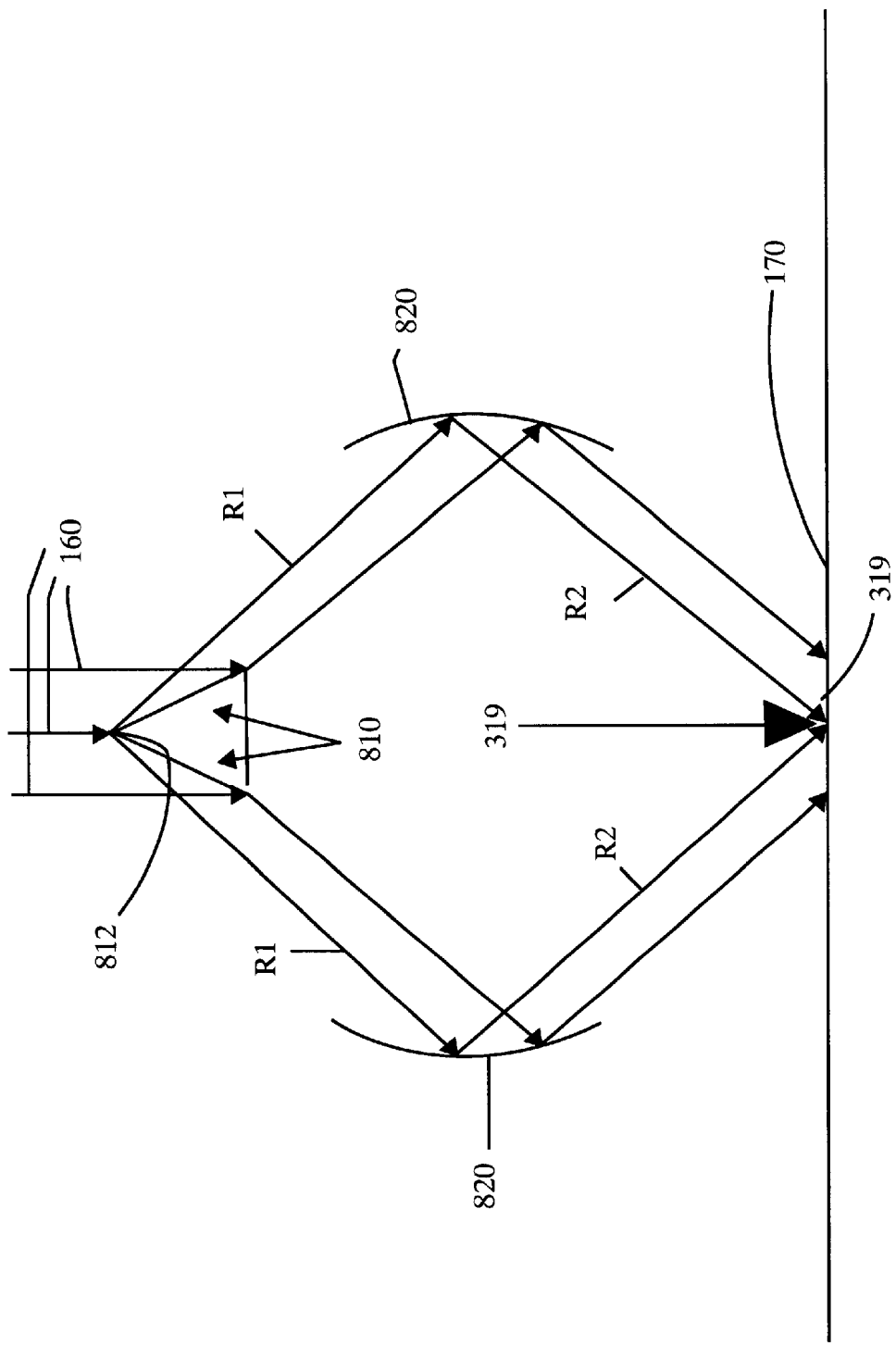
FIG. 11 shows a laser beam being split into two separate parts and being recombined into a desired (selected) shape by reflective elements while powder is fed coaxially to the processing region perpendicular to the substrate.

FIG. 11 shows a laser beam 160 being directed at a set of reflective optics in wedge form 810, the sharp corner 812 of the wedge 810 being placed in the path of the laser beam 160. The laser beam 160 is reflected at R1 towards a second set of reflective optics 820, from there the beam R2 is directed at the substrate 170 where material powder 319 is to be melted. Splitting up the beam 160 allows for space to delivery the powder or the wire such that it can be delivered perpendicular to the substrate 170 allowing for true coaxial feeding.

In a beam splitting application, the laser beam 160 can be split into two or more parts by placing a reflective element such as those previously described, into the beam path (here illustrated in two parts). In the place where the unreflected laser beam would have propagated, powder is delivered to the deposition region at an angle of approximately 90 degrees with respect to the substrate 170 surface. Using suitable reflective elements such as those previously described, the reflected parts of the beam are directed at a point where the powder flow hits the substrate surface and are recombined there. This enables a true coaxial powder feeding system, benefits of which are the mutual independence of the powder flow direction and the direction of substrate translation (feeding powder "before or after" the laser beam). Furthermore, this setup allows one to recombine the laser beam into its original shape or, depending on the process requirements, it allows one to create an overlap of selected parts of the laser beam by adjusting the second set of reflective elements. Thereby, it is possible to alter the maximum available intensity for a given high power laser. This beam shaping offers similar advantages as those previously described.

The invention can be used to perform surface alloying on components, e.g., it is possible to change for example, mild steel into stainless steel by mixing the missing elements into the top surface of the material.

Furthermore, the invention can be used for various substrate joining. Here, joining the deposited material with the substrate is optional and process-dependent. One can create an "add-on" to an existing part. However, it is possible that one wants to remove the created part as easily as possible. For example, a stainless steel part can be formed on an aluminum surface, and the laser power can be chosen such that the steel powder is melted but the aluminum substrate is not. Also, vice versa, one can create an aluminum part on a steel surface because steel is a worse conductor of thermal energy than aluminum, thereby most of the energy supplied would be used for the creation of the part.

Although the preferred embodiments describe using $CO_2$ laser and Nd:YAG lasers, the invention can use other high power lasers (i.e. Nd-based solid state lasers), and diode lasers, and the like. The invention works with continuous and pulsed lasers that supply sufficient intensity for material melting.

Similarly the subject invention can use various shield gases such as but not limited to nitrogen, argon, and helium.

Although, the preferred embodiments describe using various alloy powders, other powders can be used such as but not limited to combinations of niobium, titanium, steels, tool steels, copper, tungsten, aluminum, nickel, alloys thereof, ceramics, and cermets.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A one-step system of fabricating three dimensional (3-D) parts from metal and composite parts, comprising:

a laser for forming a high power beam into a spot location;

means for feeding material powder into the spot location coaxially to the laser beam;

an XYZ translation support means for forming forming plural deposition layers having different thicknesses, from the laser beam and the material powder; and a computer for controlling the laser, the material powder feeding means and the XYZ translation support means in order to form selected fabricated 3-D parts in one step.

2. The one-step system of claim 1, wherein the laser beam includes:

a continuous wave $CO_2$ laser with a shutter, and beam delivery optics and beam focussing optics, wherein the laser shutter, the beam delivery optics and the beam focussing optics are separately and simultaneously controlled by the computer.

3. The one-step system of claim 1, wherein the laser beam includes:

a Nd:YAG laser with a shutter connected to an fiber optic cable and output coupler, and beam delivery optics and beam focussing optics, wherein the laser shutter, the optic cable, the output coupler, the beam delivery optics and the beam focussing optics are separately and simultaneously controlled by the computer.

4. The one-step system of claim 1, further comprising:

a carrier gas supply having an adjustable flow rate for delivering the material powder to the spot location, wherein the carrier supply and the flow rate are separately and simultaneously controlled by the computer.

5. The one-step system of claim 1, further comprising:

a shield gas supply having an adjustable flow rate for being applied to the laser beam to prevent oxidation in the directly melted material powder, wherein the shield gas supply and flow rate are separately and simultaneously controlled by the computer.

6. The one-step system of claim 5, wherein the shield gas is chosen from at least one of:

argon gas, nitrogen gas and helium gas.

7. The one-step system of claim 1, wherein the material powder includes:

stainless steel powder and copper powder.

8. The one-step system of claim 1, wherein the material powder includes:

stainless steel powder and aluminum powder.

9. The one-step system of claim 1, wherein the material powder includes at least two powders chosen from at least one of:

niobium, titanium, steels, tool steels, copper, tungsten, aluminum, nickel, alloys thereof, ceramics, and cermets.

10. The one-step system of claim 1, wherein the laser can be chosen from at least one of:

a Nd-based solid state laser and a diode laser.

11. The one-step system of claim 1, further comprising:

lens means for beam shaping the laser to tailor intensity distribution of the laser beam for the deposition layers.

12. The one-step system of claim 1, further comprising:

reflective and refractive means for beam shaping the laser to form pre-selected mechanical and thermodynamics properties in the selected fabricated 3-D parts by heating the deposition layers.

13. The one step system of claim 1, further comprising:

means for performing surface alloying on metal components.

14. The one-step system of claim 1, wherein the material powder includes:

ceramic powder.

15. A fabrication system for fabricating parts, comprising:

means for splitting a laser beam into at least two angled beams each of which is not perpendicular to a substrate at a spot location;

a perpendicular delivery means for feeding metal powder at an angle of approximately 90 degrees to the substrate, wherein the metal powder is delivered in between the two angled beams;

means for recombining the two angled beams at the spot location on the substrate, means means for forming a deposition layer by the laser beam and the metal powder; and means for fabricating a part from the deposition layers on the substrate.

16. The fabrication system of claim 15, wherein the fabricating means includes:

an XYZ translation support for forming 3-D parts.

17. A system for fabricating parts comprising:

means for splitting laser beam into a first beam and a second beam;

means for focusing the first beam and the second beam at a spot location;

means for feeding material into the spot location coaxially to the laser beam; and means for forming a deposition layer by melting the material with the laser beam on a support surface.

18. The system of claim 17, wherein the support surface includes:

an XYZ worksupport that translates in the XYZ directions for forming a 3-D part.

* * * * *